US005319580A

United States Patent [19]

Sakata et al.

[11] Patent Number: 5,319,580

[45] Date of Patent: Jun. 7, 1994

[54] DIAGNOSTIC SUPPORT SYSTEM AND DIAGNOSTIC SYSTEM OF EQUIPMENT

[75] Inventors: Masao Sakata, Ebina; Takemasa Iwasaki; Tsutomu Tsuyama, both of Yokohama; Sadao Shimoyashiro, Fujisawa, all of Japan

[73] Assignee: Hitachi, Ltd., Tokyo, Japan

[21] Appl. No.: 796,677

[22] Filed: Nov. 25, 1991

[30] Foreign Application Priority Data

Nov. 24, 1990 [JP] Japan .................................. 2-320380

[51] Int. Cl.$^5$ .............................................. G05B 23/02
[52] U.S. Cl. ..................................... 364/579; 395/912
[58] Field of Search .................... 364/579, 571.01, 141, 364/148; 395/912

[56] References Cited

U.S. PATENT DOCUMENTS

| | | | |
|---|---|---|---|
| 4,189,778 | 2/1980 | Vogel | 364/579 |
| 4,847,795 | 7/1989 | Baker et al. | 364/579 |
| 4,858,144 | 8/1989 | Marsaly et al. | 364/579 |
| 5,025,391 | 6/1991 | Filby et al. | 364/579 |

FOREIGN PATENT DOCUMENTS 1289650 11/1989 Japan .

OTHER PUBLICATIONS

Bader et al.,—Integrated Processing Equipment May 1990—pp. 149-154.

*Primary Examiner*—Jack B. Harvey
*Assistant Examiner*—Thomas Peeso
*Attorney, Agent, or Firm*—Antonelli, Terry, Stout & Kraus

[57] ABSTRACT

An equipment is diagnosed by monitoring a career of operations of the equipment necessary for diagnosing the equipment and a condition of the equipment during the operation, monitoring information on equipment operations and information on variations in operation of the equipment having started operation for a data gathering purpose, selecting some of the gathered data, classifying the selected data based on rules, computing characteristics of variations in equipment state during the operation of the equipment and diagnosing the data on the basis of criterion references for the characteristics prescribed by the rules as an equipment diagnostic procedure.

8 Claims, 12 Drawing Sheets

FIG. 3(a)

WORK CAREER DATA TABLE

| PRODUCT NAME | LOT NO | PROCESS | DATE | WORK TIME |
|---|---|---|---|---|
| HM 5100 | A001 | Aℓ (1) | 90/9/10 | 14 : 10 |
| HD 6100 | B010 | Aℓ (1) | 90/9/10 | 17 : 00 |
| HD 6500 | C011 | Aℓ (2) | 90/9/11 | 01 : 20 |
| | | | | |

FIG. 3(b)

PROCESS STATE CAREER DATA TABLE

| LOT NO | MASS NUMBER | PEAK VALUE | MEASUREMENT TIME | PRESSURE | |
|---|---|---|---|---|---|
| A001 | 1 | $5\times10^{-9}$ | 14 : 10 | $2\times10^{-7}$ | |
| A001 | 2 | $1\times10^{-9}$ | 14 : 10 | $2\times10^{-7}$ | |
| A001 | 4 | $3\times10^{-10}$ | 14 : 10 | $2\times10^{-7}$ | |
| A001 | 14 | $2\times10^{-11}$ | 14 : 10 | $2\times10^{-7}$ | |
| A001 | 16 | $1\times10^{-12}$ | 14 : 10 | $2\times10^{-7}$ | |
| A001 | 18 | $4\times10^{-9}$ | 14 : 10 | $1.5\times10^{-7}$ | |
| A001 | 28 | $2\times10^{-9}$ | 14 : 10 | $1.5\times10^{-7}$ | |
| A001 | 32 | $1\times10^{-9}$ | 14 : 10 | $1.5\times10^{-7}$ | |

FIG. 3(c)

EQUIPMENT OPERATION CAREER DATA TABLE 303 301 302

| LOT NO | MEASUREMENT TIME | VALUE FOR INTRODUCING GAS | GATE VALVE | MAIN VALVE |
|---|---|---|---|---|
| A001 | 14 : 10 | CLOSE | CLOSE | OPEN |
| A001 | 14 : 12 | CLOSE | OPEN | OPEN |
| A001 | 14 : 14 | CLOSE | CLOSE | OPEN |
| A001 | 14 : 20 | OPEN | CLOSE | OPEN |
| A001 | 14 : 30 | OPEN | OPEN | OPEN |
| A001 | 14 : 32 | OPEN | CLOSE | OPEN |

FIG. 7

| DIAGNOSTIC ITEM | DATA TYPE | COMPUTATION OF CHARACTERISTICS | DIAGNOSTIC REFERENCES AND JUDGEMENT |
|---|---|---|---|
| WATER LEAK | DATA IS CLASSIFIED BY OPERATIONS TO OPEN AND CLOSE THE VALVE FOR INTRODUCING GAS THE NUMBER OF PIECES OF DATA IS 10 | MASS ANALYSIS FOR MASS NO. 18 LET THE DIFFERENCE BETWEEN THE START AND END OF THE PERIOD BE Z | A VALUE OF Z GREATER THAN 0 INDICATES A WATER LEAK A VALUE OF Z SMALLER THAN 0 INDICATES NO WATER LEAK |

WORK CAREER DATA TABLE

FIG. 10(a)

41

| DATE | DIAGNOSTIC WORK ITEM | START TIME | SEQUENCE NUMBER | COMMENTS |
|---|---|---|---|---|
| 90/12/20 | VACUUM EXHAUST | 12 : 00 | 8 | TARGET REPLACEMENT |
| 90/12/30 | VACUUM EXHAUST | 11 : 00 | 8 | TARGET REPLACEMENT |
| | | | | |
| | | | | |
| | | | | |

EQUIPMENT STATE VARIATION TABLE

FIG. 10(b)

42

| ID | MASS NUMBER | PEAK VALUE | MEASUREMENT TIME | TOTAL PRESSURE | |
|---|---|---|---|---|---|
| VACUUM EXHAUST ON 90/12/20 | 1 | $5\times10^{-9}$ | 12 : 06 | $8\times10^{-4}$ | |
| VACUUM EXHAUST ON 90/12/20 | 18 | $4\times10^{-9}$ | 12 : 07 | $4\times10^{-4}$ | |
| VACUUM EXHAUST ON 90/12/20 | 28 | $2\times10^{-9}$ | 12 : 08 | $8\times10^{-5}$ | |
| VACUUM EXHAUST ON 90/12/20 | 1 | $4.8\times10^{-9}$ | 12 : 09 | $2\times10^{-5}$ | |
| VACUUM EXHAUST ON 90/12/20 | 18 | $4.0\times10^{-9}$ | 12 : 10 | $9\times10^{-6}$ | |
| VACUUM EXHAUST ON 90/12/20 | 28 | $2.0\times10^{-9}$ | 12 : 11 | $8\times10^{-6}$ | |
| | | | | | |

EQUIPMENT OPERATION CAREER DATA TABLE

FIG. 10(c)

43

| ID | MEASUREMENT TIME | MAIN VALVE | TIME | BAKING HEATER | |
|---|---|---|---|---|---|
| VACUUM EXHAUST ON 90/12/20 | 12 : 00 | CLOSE | 06 | OFF | |
| VACUUM EXHAUST ON 90/12/20 | 12 : 10 | OPEN | 07 | OFF | |
| VACUUM EXHAUST ON 90/12/20 | 12 : 20 | OPEN | 08 | ON | |
| VACUUM EXHAUST ON 90/12/20 | 12 : 40 | OPEN | 09 | OFF | |
| | | | | | |

FIG. 11

| DIAGNOSTIC ITEM | EXHAUST AFTER TARGET REPLACEMENT |
|---|---|

| EQUIPMENT OPERATION | MONITORED DATA |
|---|---|
| VACUUM EXHAUST | TOTAL PRESSURE |
| PROCESSING-CHAMBER BAKING | GAS ANALYSIS |
| VACUUM EXHAUST | GAS ANALYSIS |

DIAGNOSTIC SUPPORT SYSTEM AND DIAGNOSTIC SYSTEM OF EQUIPMENT

BACKGROUND OF THE INVENTION

The invention relates to a system for diagnosing equipment. In particular, the invention relates to a diagnostic support system and a diagnostic system capable of judging the conditions of semiconductor manufacturing equipment based on operating states of the equipment.

Using a technique for diagnosing manufacturing equipment, data considered to be relevant to abnormalities and failures of the equipment to be diagnosed is measured and then processed in order to obtain quantities which serve as indicators of abnormalities, failures and deteriorations. A technique for judging the state of an apparatus based on such indicators exists and is becoming popular as an equipment diagnosing technology. Such a technology is described, for example, by Toshio Sada, Shouzou Takada, et al. in an article with the title "The state of the Art and the Future of Equipment Diagnosing Technologies" written on pages 3 to 10 of a technical magazine "Measurement and Control", Vol. 25, No. 10 published in the year of 1988.

This diagnosing technique requires that equipment parameters clearly relevant to abnormalities and failures of the equipment be known in advance. Moreover, it is necessary to install sensors or the like which are not related directly to the operation of the equipment as means for reading the equipment parameters. When applying this diagnostic technique to the manufacturing of a semiconductor device, it is necessary to further specify parameters that are clearly related to abnormalities of the device.

By the way, in a process for creating a layer using a sputtering technique or a Chemical Vapor Deposition technique (referred to hereafter as a CVD technique) adopted in the manufacturing of semiconductor devices and in a dry etching technique and the like, a physical chemistry reaction works in an unequilibrium state utilizing a weak electrical current plasma. In order to sense the state of such a process, a probing technique is adopted. In the probing technique, a sensor that inadvertently causes disorder is typically installed. Such a sensor usually disturbs the reaction that should naturally work normally. In some cases, the sensor adversely gives rise to bad products. As such, this technique has shortcomings leading to impracticability.

Recently, manufacturing requirements are getting severe on the performance enhancement of semiconductor devices. Therefore, semiconductor processes tend to generate defective products due to device abnormalities. In order to cope with this problem, a countermeasure is taken by detecting abnormalities and failures of the equipment at an early stage. It is essential to reduce the number of bad products produced.

By the way, when diagnosing an equipment, it is necessary to specify parameters of the equipment as in the case with the conventional technique described above. However, there has been a problem caused by the fact that parameters relevant to abnormalities of the semiconductor manufacturing equipment are difficult to be specified clearly. This is because a diagnostic system for grasping phenomena indicating equipment abnormalities does not exist. Such phenomena can be used as a basis for detecting abnormalities of the equipment.

SUMMARY OF THE INVENTION

It is a first object of the present invention to provide a diagnosing support technique for supporting the institution of equipment diagnostic rules using information on movements of the equipment and information on a condition of machine's operation. In other words, the diagnosing support technique serves as a support tool allowing the user to grasp phenomena that can be used as a basis for diagnosing the equipment.

In addition, it is a second object of the present invention to provide a diagnostic support system for supporting the detection of the phenomena and for supporting the institution of diagnostic rules used for diagnosing the equipment based on acquired data.

Further, it is a third object of the present invention to provide a diagnostic system for diagnosing the equipment using the information on movements of the equipment and information on a condition of a machine's operation.

In order to achieve the first object of the present invention, a diagnosing support technique for a diagnosing semiconductor manufacturing equipment is provided according to one of the aspects of the present invention. The diagnosing support technique comprises the steps of acquiring information relevant to a condition of machine's operation and movements of machine's parts as data in time sequence during the operation of the semiconductor manufacturing equipment, and outputting data representing the movements of the equipment and data representing variations of the information relevant to a condition of machine's operation with their time axes used as a common axis.

In order to achieve the second object of the present invention, an equipment diagnostic support system is provided according to another aspect of the present invention. The equipment diagnostic support system comprises means for instituting diagnostic rules by: displaying diagnostic items indicating events to be checked occurring in an equipment to be diagnosed, data classifications specifying ranges of data related to the events, characteristic formulas for computing characteristics inherent in the events, criterion references for the computed characteristics and diagnostic results as the diagnostic rules; receiving specifications of conditions of the diagnostic items, the associated events, the data related to the events, the characteristics and the criterion references; and setting the specified conditions in the diagnostic rules.

In order to achieve the third object of the present invention, a diagnostic system of equipment is provided according to a further aspect of the present invention.. The diagnostic system comprises: means for acquiring information on a condition of machine's operation and on movements of the machine's parts as data in time sequence during the operation of the equipment; means for storing diagnostic rules instituted in advance; and means for determining whether or not an event prescribed by the diagnostic rules has occurred by checking the data acquired in time sequence against conditions prescribed by the diagnostic rules; wherein the diagnostic rules stored in the diagnostic rules storage means for each diagnostic item indicating an event to be diagnosed include rules of classified data for specifying ranges of data related to the event, characteristic computation expressions for computing characteristics inherent in the event and judgement rules comprising criterion references for judging the computed characteristics and judgement results; and the determinatin means is provided with functions for extracting data for each aforementioned diagnostic item from the data acquired in time sequence in accordance with the rules of classified data, computing characteristics of the extracted data using the characteristic computation formulas, checking the computed characteristics against the criterion references of the judgement rules, and obtaining corresponding judgement results.

Applications of the invention are not limited to a system for judging the condition of equipment based on operating states of the equipment. The invention can also be applied to a system for judging the condition of the equipment in its preparation state. The following is an example of such an application of the invention.

For a semiconductor manufacturing equipment, it is also necessary to keep the equipment in a usable state. In the case of an apparatus for creating layers, the product sticks to the inner wall or the like of the apparatus during the layer creation process before being peeled off. As a result, such a process often gives rise to production of bad products. It is therefore necessary to do preventive maintenance work periodically on the apparatus. During the maintenance work, the vacuum tub of the apparatus is exposed to the atmosphere. At that time, manual work such as replacement of internal tools is carried out. In order to verify whether or not the maintenance work has been done correctly, an actual vacuum exhaust operation and others are again carried out and then a dummy wafer is used for simulating actual manufacturing work without directly monitoring the state of the equipment after the maintenance work has been completed. Finally, results of the process of creating layers are evaluated in order to verify the maintenance work and judge it to be good or poor. Note that it takes a lot of time to verify the maintenance work of the equipment. This is because there is no technique for judging the state of the equipment in a short time slot outside the routine operating period of the equipment.

The state of the equipment in which the maintenance work described above is verified and the condition of the equipment is judged to be good or poor after the maintenance work has been completed is referred to hereafter as a preparation state. The invention is also effective for evaluating the preparation state of the equipment as well.

According to the invention, information on operations of the equipment is acquired by storing a career of equipment operations. The career of the equipment operations comprises operation items and times at which the operation items take place. As for a condition of the equipment operation, variations in process state with time occurring in the equipment during a process to manufacture a product and times at which the variations occur are recorded. Typically, time information is appended to the operation items and the variations in process skate.

In order to institute the rules described previously, both time axes of the career of the equipment operations described above and the variations in process state during the process to produce a product are used as a common axis. In this way, a relation between the equipment and the process state can be visually grasped with ease. The relation includes, among other things, fluctuations in process state occurring in response to operations of the equipment, changes in process state with specific operations of the equipment and interactions among process conditions. The visual observation of such a relation allows events to be detected accurately and diagnostic rules to be instituted with ease.

As such, in a semiconductor manufacturing process, diagnostic rules can be instituted from operations and process states of a normal run of the equipment. In this way, the diagnostic rules are not instituted at laboratories based on experiments that are not directly related to the manufacturing process. Instead, the diagnostic rules are developed from the manufacturing process itself.

In order to diagnose the equipment, both of the data are combined on a single common time axis to allow processings to be performed in accordance with rules instituted in advance. The processings include varying process states from operation item to operation item of the equipment and comparing them. Then, characteristics are computed according to rules of process states among the items so that the equipment can be diagnosed by comparing the characteristic to criterion references prescribed by the rules.

BRIEF DESCRIPTION OF THE DRAWINGS

FIGS 3A-3C are diagrams used for explaining the structure of diagnostic data used in the first embodiment according to the invention;

FIG. 7 is a diagram used for explaining items of diagnostic rules used in the diagnostic system according to the invention and entries for the system;

FIGS. 10( *a*), 10 (*b*) and 10 (*c*) are diagrams used for explaining structures of diagnostic data of the equipment diagnostic system for an equipment in its preparation state;

FIG. 11 shows typical diagnostic operations input to the equipment diagnostic system for an equipment in its preparation state.

DETAILED DESCRIPTION OF PREFERRED EMBODIMENTS

Embodiments of the invention are described as follows.

Figure 1:
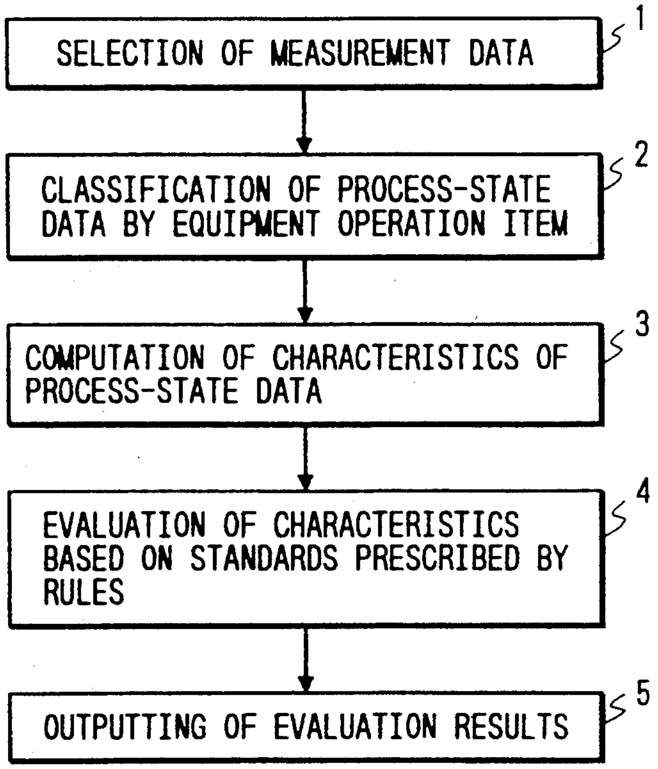
FIG. 1 is a flowchart showing a processing flow adopted by a first embodiment according to the invention.

FIG. 1 shows a processing flow of a first embodiment implementing the diagnostic system in accordance with the invention.

Processing step 1 shown in the processing flow of FIG. 1 first selects some of measurement data or data to be diagnosed. The data to be diagnosed includes a career of operations and variations in manufacturing condition of the equipment. There is a large amount of raw data which is of the order of 2000 to 3000 pieces of information. Such data is too large to be diagnosed and, thus, not suitable for diagnostic processing. Therefore, in this embodiment, processing step 2 is carried out to classify the data. The classification of the data is based on data selection rules which state, among other things, that only data measured during a period between certain operations of the equipment shall be selected from the career of equipment operations and that the selection of data between the certain operations shall be performed so as to choose only 10 items of information.

Processing step 3 processes the classified data in accordance with a technique for computing a characteristic of the data abiding by the corresponding rules. The measurement data is converted into quantities having a format which is acceptable by a computer. That is to say, the format must be such that the data can be diagnosed by decision based on a result of comparison between characteristics or comparison of a characteristic to a reference value. The results of the comparisons are typically used in processing step 4 for judging characteristics. For each diagnostic item, the value of its characteristic computed in accordance with the rules is known in advance. Accordingly, the data can be judged to be either normal or abnormal for each diagnostic item. The judgement is finally output as diagnostic results by processing step 5.

Diagnostic rules can be instituted individually for a diagnostic item, a formula for computing its characteristic for diagnosing, a range of data to be computed, a criterion for judging the characteristic and each output item of the results.

Figure 2:
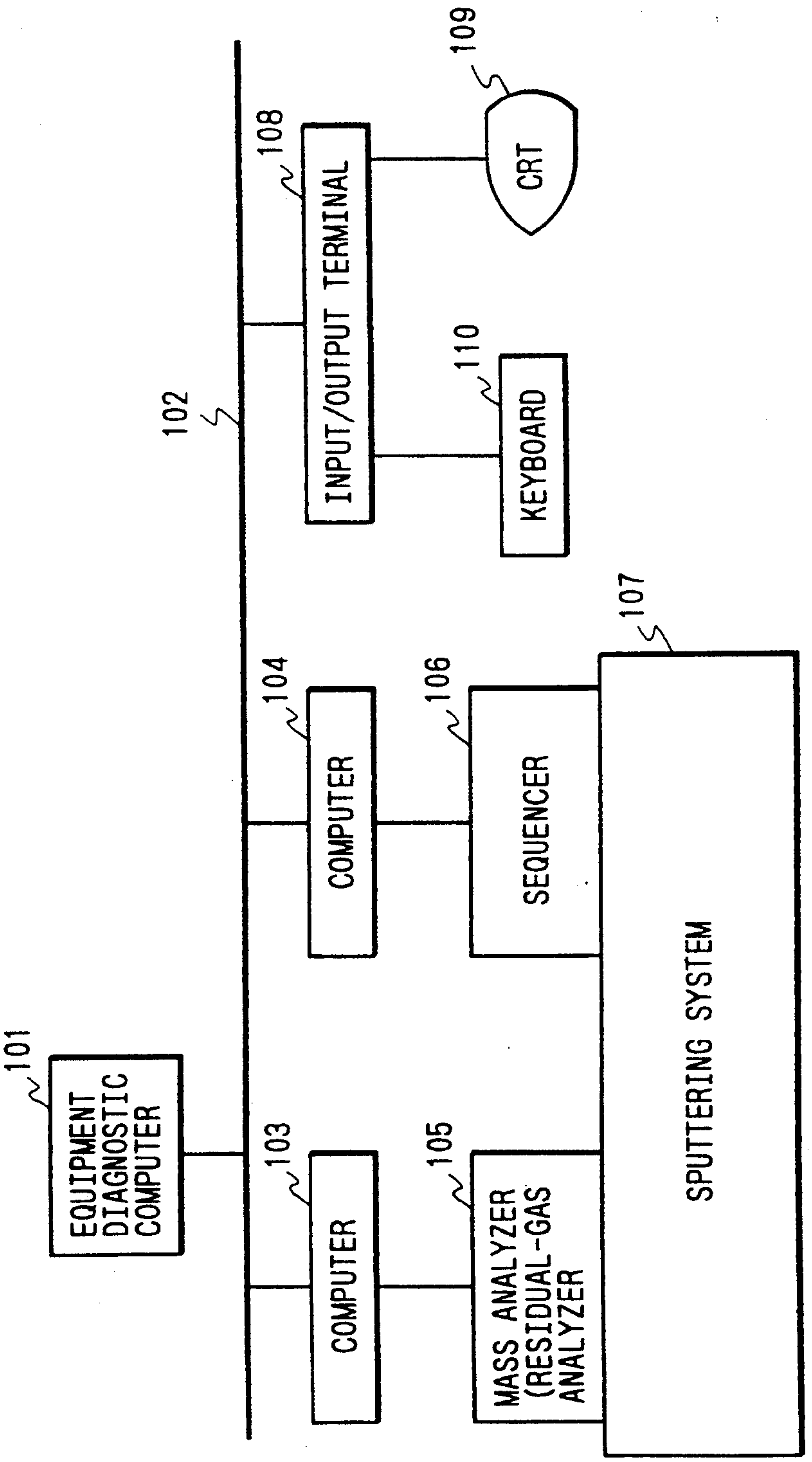
FIG. 2 shows a block diagram of a typical hardware configuration of a diagnostic system and a diagnostic support system according to the invention.

FIG. 2 is a hardware configuration of the embodiment for a sputtering system of a semiconductor manufacturing equipment used in a process of creating a layer. The embodiment is implemented into the hardware configuration in accordance with the invention.

It is an object of the embodiment to diagnose the vacuum conditions of the equipment by monitoring mass analysis data indicating processing states.

The diagnostic system implementing the embodiment comprises an equipment diagnostic computer denoted by reference numeral 101, lower-level computers denoted by reference numerals 103 and 104 and an input-/output terminal denoted by reference numeral 108. The input/output terminal 108 serves as an interface with the operator, for inputting and outputting data. The equipment diagnostic computer 101, the lower-level computers 103 and 104 and the input/output terminals are connected to each other by a communication circuit denoted by reference numeral 102.

Reference numeral 107 is the sputtering system itself. Reference numeral 105 is a mass analyzer (or a residual-gas analyzer) for analyzing the type of gas based on an analysis of the gas atmosphere of the sputtering system 107 which indicates the process states thereof. Reference numeral 106 is a sequencer for controlling the operation of the sputtering system 107. The residual-gas analyzer 105 and the sequencer 106 are both attached to the sputtering system 107. The residual-gas analyzer 105 and the sequencer 106 are connected to the lower-level computers 103 and 104, respectively. The lower-level computers 103 and 104 process data received from the residual-gas analyzer 105 and the sequencer 106, respectively.

The equipment diagnostic computer 101 comprises a central processing unit (CPU), a memory unit for storing programs and data of the CPU, a timer for setting the time of the day, an interface unit for inputting and outputting signals and an external storage device capable of storing rules and accumulating a large amount of acquired data which are not explicitly shown in FIG. 2. Diagnostic programs and programs for supporting the diagnosis are loaded into the memory unit. Executing the programs, the CPU functions as means for implementing rules concerning data acquired in time sequence and means for determining whether or not an event prescribed by diagnostic rules has occurred by checking the data acquired in time sequence against the diagnostic rules in accordance with conditions prescribed therein.

The computers 103 and 104 each comprises a CPU, a memory unit for storing programs and data of the CPU, a timer for setting the time of the day and an interface unit for inputting and outputting signals which are not explicitly shown in FIG. 2. The computers 103 and 104 serve as buffers for temporarily storing mass analysis data and system operation data, respectively. At the time the measurement is completed, the data is transferred to the equipment diagnostic computer 101. Programs for carrying out the processings are loaded into the memory units. Executing these programs, each of the CPUs functions as means for acquiring data in time sequence.

To be more specific, the computer 103 takes in outputs from the residual-gas analyzer 105, adding time information to them. The outputs from the residual-gas analyzer 105 with time information added thereto are used as information on a condition of machine's operation. The computer 104 takes in data output by the sequencer 106, adding time information thereto. The data with the time information added is used as information on movements of the machine's parts.

Time information is provided by the timers. The timers of the computers 101, 103 and 104 are adjusted in advance to the time of the day.

The input/output terminal 108 is connected to a display unit and a keyboard denoted by reference numerals 109 and 110. The display unit 109 is used for displaying, among other things, diagnostic information. The keyboard 110 is capable of inputting data and commands. A mouse and the like can also be attached as well.

Data stored in the equipment diagnostic computer 101 has formats shown in FIG. 3.

To be more specific, data is recorded in the following tables:

(a) Work career data table (b) Process state career table (c) Equipment operation career table The work career data table is used as a control table for storing lot numbers being processed, product names, processes, dates and start times. These items of information are typically input from the input/output terminal 108. A lot number is used as an identifier (ID) relating the work career data table to a process state career table and an equipment operation career table.

A process state career table is used for recording measurement data of the mass analysis in time sequence. The measurement data includes a mass number, a peak value, a measurement time and a pressure.

An equipment operation career table is used for recording the operation of the system, specifically, changes in state occurring in a valve for introducing gas, a gate valve and a main valve denoted by reference numerals 303, 301 and 302, respectively. The type of a change and the time at which the change occurs are logged in the table.

It should be noted that each of the tables shown in FIG. 3 can be displayed in the display unit 109 of the input/output terminal 108.

Figure 4:
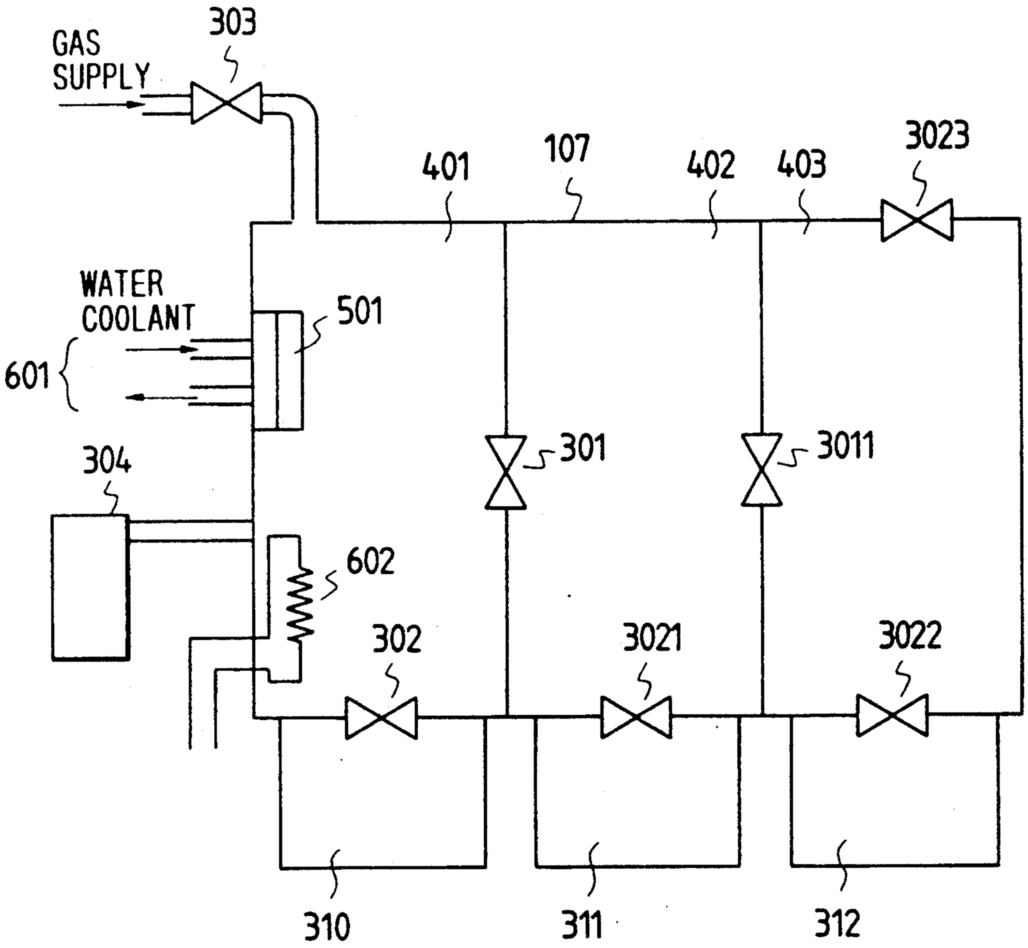
FIG. 4 is a block diagram of a typical configuration of a sputtering system.

FIG. 4 shows a configuration of the sputtering system 107 of FIG. 2 that is drawn deliberately to illustrate its principle of operation.

The valve 303 for introducing gas shown in FIG. 4 supplies Ar, inert gas, to a processing chamber, denoted by reference numeral 401, of the sputtering system 107. The main valve 302 connects a vacuum exhaust pump, denoted by reference numeral 310, to the processing chamber 401. With the main valve 302 opened, the sputtering system 107 operates to carry out a vacuum exhaust operation. The gate valve 301 allows water supplied to the sputtering system 107 to enter the processing chamber 401, indicating the beginning of a process to create a layer. Note that the sputtering system 107 is also equipped with a preparation chamber and an interface chamber denoted by reference numerals 402 and 403, respectively. In addition, the sputtering system 107 also includes other main valves denoted by reference numerals 3021, 3022 and 3023, another gate valve denoted by reference numeral 3011 and other vacuum exhaust pumps denoted by reference numerals 311 and 312. The residual-gas analyzer 105 is connected to the processing chamber 401 for monitoring the gas atmosphere thereof. The processing chamber 401 is provided with a baking heater denoted by reference numeral 602. In addition, a sputtering target denoted by reference numeral 501 is located in the processing chamber 401. When a sputtering operation is performed, the temperature increases. In order to cope with such an increase in temperature, a water cooling pipe denoted by reference numeral 601 is provided for cooling by supplying water coolant from the rear surface. During the process to create a layer, the sputtering target 501 serves as a vaporization source for creating the layer, consuming its substance. Accordingly, as the substance is exhausted, the sputtering target 501 needs to be replaced. In this case, the processing chamber 401 that is normally kept in a vacuum state is exposed again to the atmosphere when replacing the sputtering target 501. After the replacement of the sputtering target 501 has been completed, the processing chamber 401 is returned back to a vacuum state by performing an exhaust operation. As in the case by the conventional technique, during maintenance work such as the replacement of the sputtering target 501, a small leak may inadvertently result in the sputtering system 107 or dirt or the like may be carelessly introduced by the hands of the person doing the work. In order to cope with these problems, the embodiment diagnoses the state of the sputtering system 107 to determine whether the state of the sputtering system 107 is good or bad.

Figure 5:
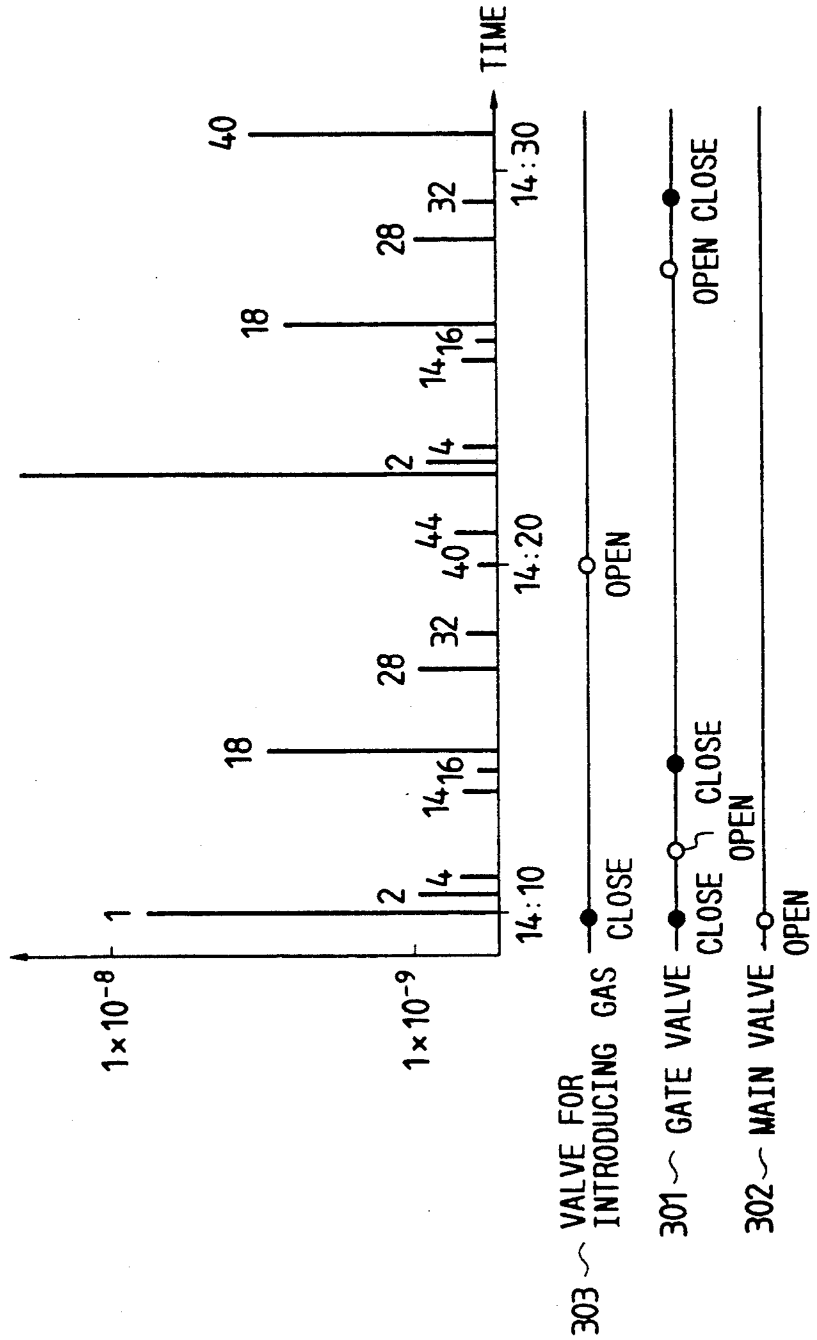
FIG. 5 is a diagram used for explaining a first analysis example of the diagnostic data.

FIG. 5 shows both operation data and mass analysis data on a page with their time axes used as a common axis. The data shown in the figure is based on the typical data of FIG. 3 for one of embodiments implemented in accordance with the invention for the sputtering system 107.

The data shown in FIG. 5 is obtained as processing results output by the equipment diagnostic computer 101. The data can be displayed, for example, in the display unit 109 of the input/output terminal 108 shown in FIG. 2.

From FIG. 5, the relation between the process state data of the mass analysis and the operation data of the sputtering system 107 becomes apparent. It is obvious that by opening the valve 303 for introducing gas, the intensity of the Ar gas having the mass number 40 increases. For example, if the peak value of the Ar gas having the mass number 40 does not increase even after the valve 303 for introducing gas is opened, the operation of the valve 303 can be judged to be abnormal.

As described later, such a judgement is translated into a rule. In other words, by studying operations of a particular system and accompanying behaviours of particular kinds of gases, diagnostic rules can be instituted for the system.

Figure 6:
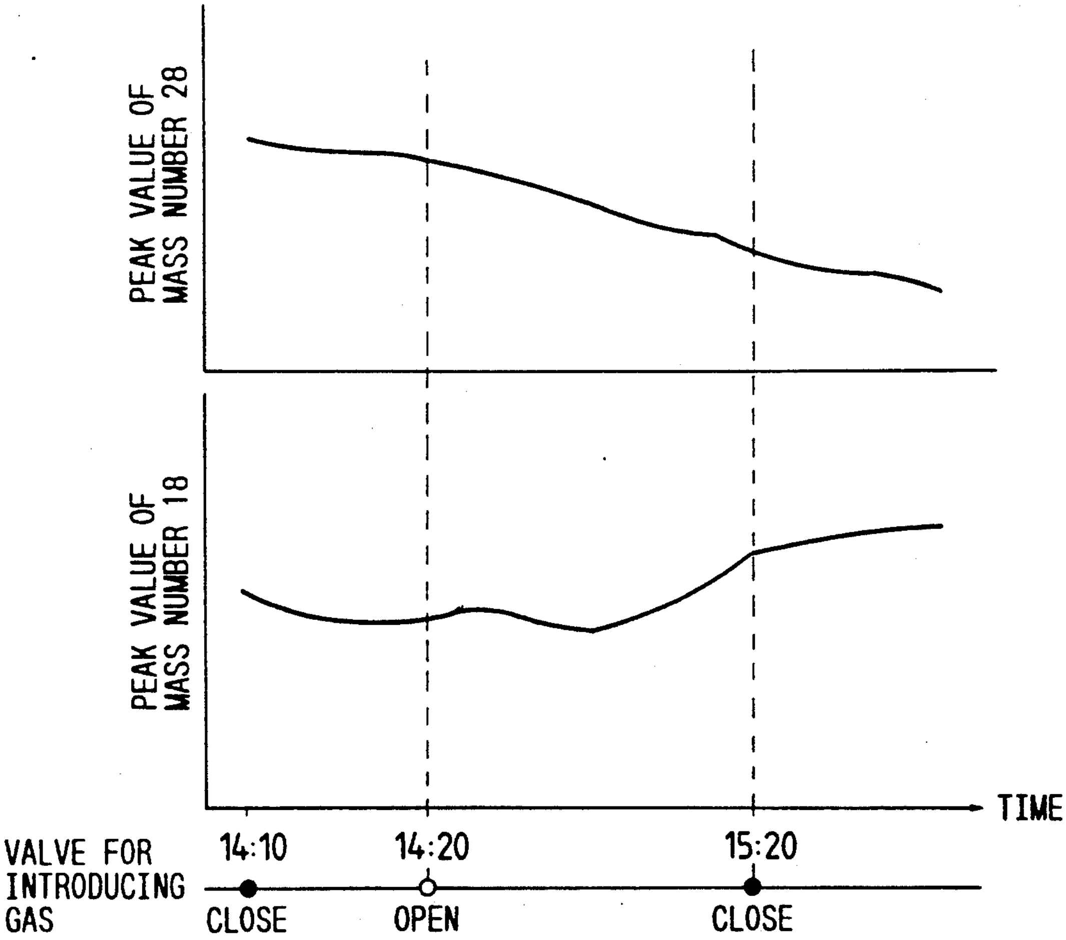
FIG. 6 shows a second analysis example of the diagnostic data.

FIG. 6 shows results of a study of operations of the valve 303 for introducing gas and accompanying behaviours of gases having the mass numbers 18 and 28. This figure also shows processing results output by the equipment diagnostic computer 101 as well. Like FIG. 5, they can be displayed in the display unit 109.

As described above, while the semiconductor manufacturing equipment is operating, information on a condition of the machine's operation and movements of the machine's parts is acquired as data in time sequence. Variations of the information on a condition of the machine's operation and movements of the machine's parts are then output as visual data having a common time axis so as to allow the engineer to form a judgement.

Since data is organized into tables shown in FIG. 3, a display like that shown in FIG. 5 can be output by searching the tables of FIG. 3 with the operation data and mass number specified. For example, a search command is entered by pressing a search key on the keyboard 110 of the input/output terminal 108. The input/output terminal 108 forwards the search command to the computer 101 through the communication circuit 102. In response to the received search command, the computer 101 searches the tables shown in FIG. 3 for necessary data and sends the data to the input/output terminal 108. The data is then displayed on the display unit 109.

The sputtering system 107 opens and closes the valve 303 for introducing gas. The period between the opening and closing of the valve 303 for introducing gas is called a sputtering period. From FIG. 6 it is obvious that the peak value of nitrogen with the mass number 28 decreases during the sputtering period. Under a normal condition, sputtering bombards the vaporization substance with Ar ions, causing the substance to evaporate. The evaporating substance enters an active state, combining with residual gas in the processing chamber 401. The mixing process of the evaporating substance with the residual gas has an effect of reducing the partial gas pressure and the vacuum state of the processing chamber 401. This effect is known as the gettering effect. This phenomenon justifies the variations in peak value for the mass number 28 shown in FIG. 6.

On the other hand, the peak value of the mass number 18 increases during the sputtering period. This increase in peak value first seems to contradict the phenomenon described above. However, remember that the mass number 18 is for the water. As described previously, the rear surface of the vaporization substance of the sputtering target is cooled with water. A water leak in the seal portion of the water coolant system is considered to be the cause of the increase in peak value for the mass number 18. Accordingly, the increase does not contradict the above phenomenon.

As such, the diagnostic computer 101 has a function for supporting the analysis of data shown in FIG. 3.

FIG. 7 shows an embodiment wherein analyzed data is stored in the diagnostic computer 101 as diagnostic rules.

As described previously, the diagnostic rules typically are concerned with diagnostic items, data types, characteristic computation formulas, diagnostic references and judgement items. FIG. 7 particularly shows rules for the phenomenon caused by the water leak shown in FIG. 6. It is needless to say that diagnostic items are not restricted to those shown in FIG. 7. For example, a variety of possibilities based on specialists' knowledge and experiences gained from processes can be added. The various items of FIG. 7 are typically shown in the display unit 109 of the input/output terminal 108 as they are and the operator then enters necessary data to appropriate entries.

Referring to FIG. 7, the diagnostic rules will be next described as follows.

The diagnostic item is the "WATER LEAK". The data type particularly specifies operation data of the sputtering system 107 acquired during a period between the operations to "OPEN" and "CLOSE" the "VALVE FOR INTRODUCING GAS". The number of data pieces is "10".

The characteristics include the "PERIOD", an "INITIAL VALUE" (a0), a "LAST VALUE" (a10) and a difference "Z". An equation for the characteristics is given as follows:

$$Z=a0-a10$$

A negative difference "Z" computed according to the above equation indicates that the peak value of the water does not decrease, that is, either increases or remains unchanged during the sputtering. In other words, the fact that the peak value of the water does not decrease implies that some abnormalities exist in the water cooling system of the sputtering system 107. Accordingly, a positive difference "Z" denotes that a water leak exists.

As such, the embodiment allows diagnostic rules for abnormalities to be instituted by analizing both process conditions and operation data of the sputtering apparatus 107. In this case, the institution of the rules is always based on the working data of a product and the instituted rules are always closely associated with the apparatus. Accordingly, the apparatus can be diagnosed reliably. As a result, the number of causes giving rise to bad products can thus be decreased.

It should be noted that the number of diagnostic rules can be increased with the addition of diagnostic items, process conditions or the like. Moreover, when the setting conditions of the apparatus are changed or a new condition is added, the diagnostic rules can also be altered or a new rule can be added.

In addition, messages are stored in advance for each diagnostic item. A message describes actions to be taken when diagnosing the apparatus as described above. A message can also be displayed as a part of diagnostic results. The following is a typical message example:

"Halt the apparatus"

Figure 8:
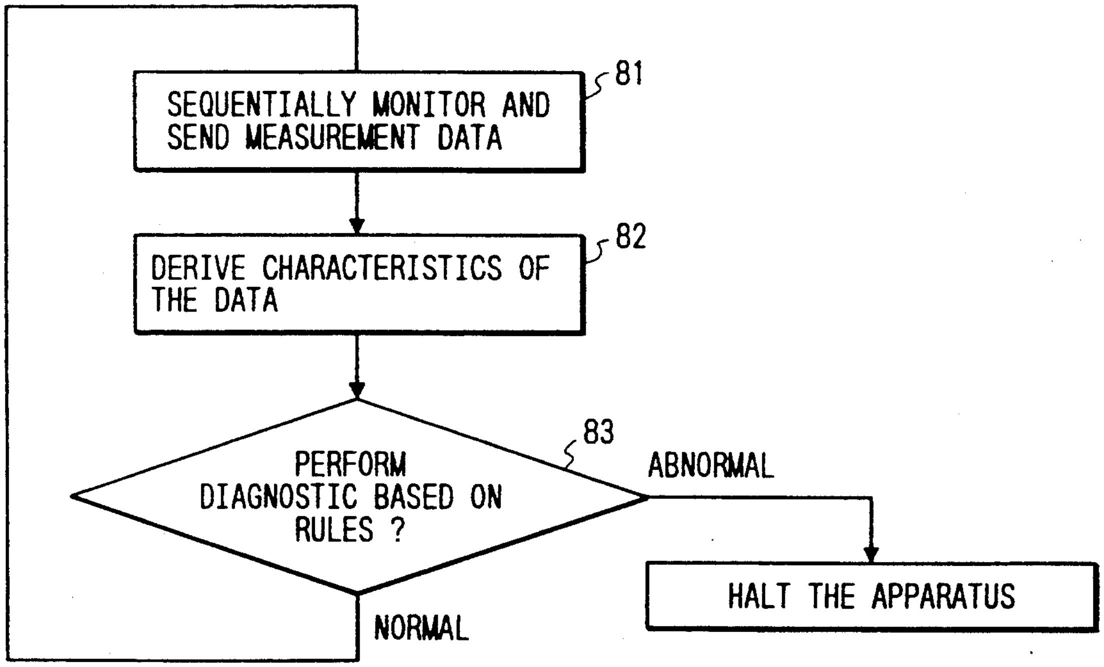
FIG. 8 is a flowchart showing a processing flow adopted in an embodiment implementing a diagnostic system in accordance with the invention.

FIG. 8 shows a processing flow of a second embodiment.

The embodiment has a configuration that allows the apparatus to be monitored and diagnosed all the time. The basic flow of this embodiment is the same as that shown in FIG. 1. Measurement data is transferred to the diagnostic computer 101 for each measurement by the monitor. The data is then processed in accordance with a computation expression for characteristics prescribed by diagnostic rules.

At Step 81, the computers 103 and 104 monitor pieces of data one after another and transmits the data to the diagnostic computer 101. The data is sampled at fixed sampling intervals. At Step 82, the diagnostic compute 101 extracts characteristics from the data transmitted by the computers 103 and 104. At Step 83, the extracted characteristics are checked against diagnostic rules which are instituted in advance. In this way, the apparatus is diagnosed. If the characteristics are found to be normal, the flow returns to Step 81. This iteration is repeated thereafter. If the characteristics are found to be abnormal, however, the flow proceeds to Step 84 at which a command to halt the apparatus is issued.

AS such, by utilizing the embodiment shown in FIG. 8, the apparatus can always be monitored even if the apparatus is operated automatically. Accordingly, a continuous operation can be carried out while diagnosing the state of the apparatus.

The embodiment described above is equipped with the diagnostic computer 101 as a host. By providing either of the computers 103 and 104 with the functions of the host, however, the diagnostic computer 101 can be eliminated. In addition, another input/output unit having similar functions to those of the input/output unit 108 can be added to one or all of the computers 101, 103 and 104 as a supplement to or a replacement of the input/output unit 108.

As another alternative, some of the functions of the computers 103 and 104 can be transferred to the diagnostic computer 101, leaving only the functions for executing data acquisition in time sequence and data transmission. In this way, the hardware configuration of the computers 103 and 104 can be simplified.

Next, a third embodiment of the invention is described. The third embodiment particularly implements an equipment diagnostic system that works when the equipment is in a preparation state.

Figure 9:
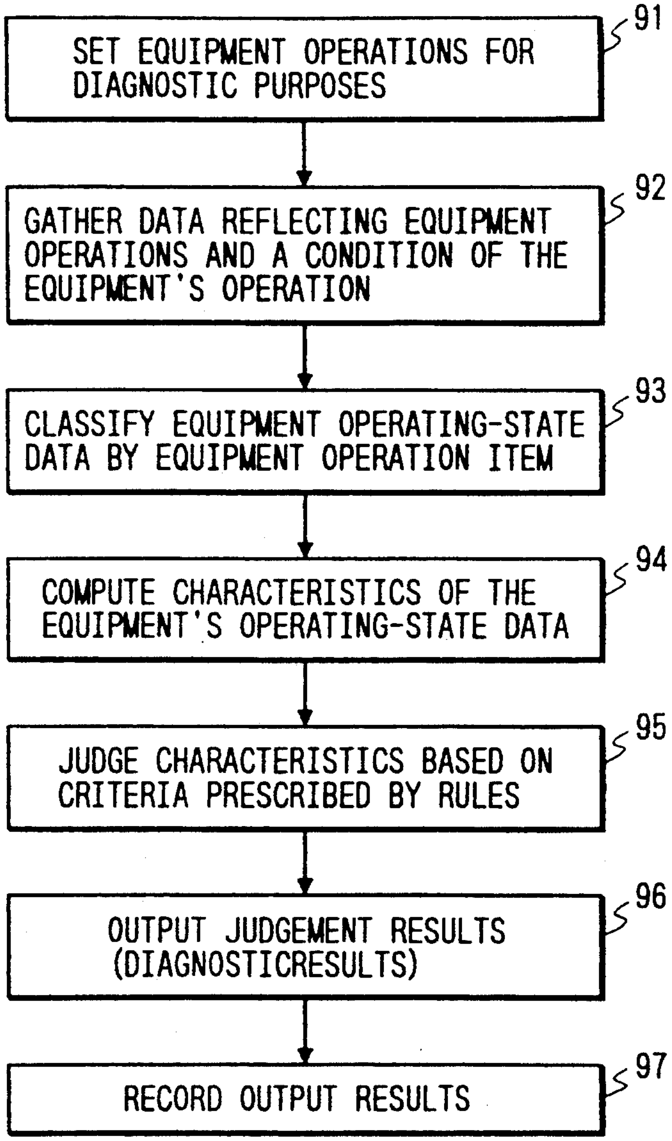
FIG. 9 is a flowchart showing a processing flow adopted in a third embodiment implementing an equipment diagnostic system in accordance with the invention for an equipment in its preparation state.

FIG. 9 is a diagnostic processing flowchart of the embodiment implementing a technique for diagnosing semiconductor manufacturing equipment and its diagnostic system in accordance with the invention. In processing step 91 shown in FIG. 9, equipment operations for diagnostic use are initially set in the equipment. That is to say, measurement-data of the equipment corresponding to variations in equipment state required for the diagnostic prescribed in diagnostic rules is set. In other words, a career of equipment operations and items to be monitored as equipment states during the operation of the equipment are set in the equipment. In processing step 92 following the setting of data in processing step 91, information on equipment operations at an actual equipment run and information on variations in equipment state occurring during the operation are monitored in order to gather data representing equipment operations and a condition of the equipment's operation. In processing step 93, data representing variations in equipment state occurring during the operation of the equipment is selected from the data collected in processing step 92 and formed into a career of equipment operations. Then, only data representing variations in equipment state occurring during the operation of the equipment to be diagnosed is selected. However, the amount of data is still substantial. To be more specific, the number of data pieces is of the order of 2,000 to 3,000. Such a large amount of data is not suitable for diagnostic processing. In the embodiment, a rule is therefore instituted for selecting particular data from the career of equipment operations. An example of the rule is that "only data acquired during a period between two certain operations of the equipment shall be selected" or that "only 10 pieces of data acquired in a period between two operations shall be selected". The data selection rule serves as a base on which data is classified. In this way, data representing a condition of the equipment's operation is classified by equipment operation item.

In processing step 94, the classified data representing a condition of the equipment's operation is processed according to a technique for computing characteristics of data prescribed by the rules. Processing step 94 includes setting of a variation trend by comparing data values among data gathered in time sequence. The variation trend is set by computing characteristics for variations in equipment state occurring during the operation of the equipment. In processing step 95, the characteristics are then diagnosed and judged in accordance with criteria for the characteristics prescribed by the rules. That is to say, the data is diagnosed by comparing the characteristics to each other or to criterion reference values. In processing step 96, results of judgement or diagnostic results are output. The output of the diagnosis for each diagnostic item prescribed by the rules is known in advance. Therefore, when a characteristic is computed, the diagnostic output can be used for judging the characteristic by, for example, comparison. For the diagnostic item, the data can thus be judged to be normal or abnormal. A phenomenon occurring in an equipment state such as leakage of $O_2$ gas and an excessive high temperature can also be detected. The result of the judgement of data and the detection of such phenomena are examples of the diagnostic results. In processing step 97, the output results are recorded.

The hardware configuration of this embodiment is the same as that of FIG. 2.

FIG. 10 shows a structure of diagnostic data stored in the equipment diagnostic computer 101 of FIG. 2 used in the equipment diagnostic system at the time the equipment has entered a preparation state. Data transmitted and stored in the equipment diagnostic computer 101 of FIG. 2 has formats shown in FIG. 10. In other words, data is recorded in a work career data table, equipment operating state variation tables and equipment operation career data tables denoted by reference numerals 41, 42 and 43 and shown in FIGS. 10 (*a*), (*b*) and (*c*), respectively. The work career data table 41 is a control table for recording dates on which the diagnosis is performed, diagnostic work items such as vacuum exhaust, diagnosis start times, diagnostic sequence numbers and diagnostic comments such as target replacement. This data is typically entered via the input/output terminal 108. The work career data table 41 is related to an equipment operating state variation table 42 and an equipment operation career data table 43 using an identifier (ID) comprising a date and a diagnostic work item. In the equipment operating state variation table 42, the number of masses, peak values, measurement times and total pressures of measurement data of a mass analysis in time sequence are recorded with a date and a diagnostic work item taken as an ID. In the equipment operation career data table 43 are recorded the opened and closed states of the main valve 302 of FIG. 4 in equipment operations and measurement times at which the state of an equipment part changes. Examples of changes in state of an equipment part are the turning on and off of the baking heater 602. In other words, a time at which the state of an equipment part changes and how the state changes are recorded. The tables 41 to 43 in FIG. 4 can also be displayed in the display unit 109 of the input/output terminal 108 as they are. In addition, by using the input/output terminal 108, an analysis using the tables 41 to 43 in FIG. 4 can be carried out in order to obtain knowledge used for instituting rules. The knowledge of analysis results can then be recorded as rules.

Figure 12:
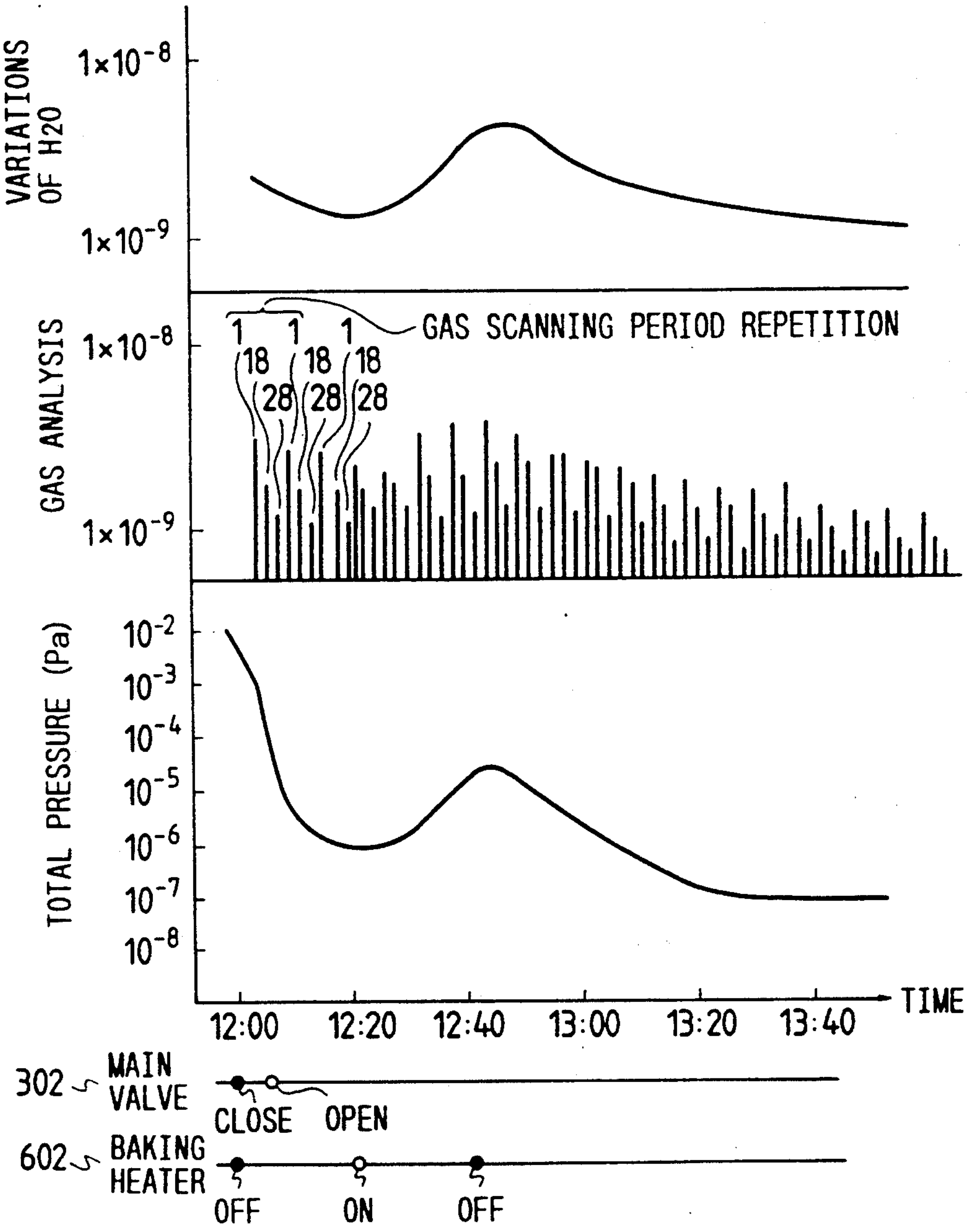
FIG. 12 shows typical diagnostic data output and displayed by the equipment diagnostic system for an equipment in its preparation state.

FIG. 11 shows typical inputs of diagnostic operations performed by the equipment diagnostic computer 101 of FIG. 2. After maintenance work such as replacement of the target 501 shown in FIG. 3 has been done, the quality of the maintenance work needs to be evaluated. The evaluation work comprises a vacuum exhaust operation and baking of the processing chamber 401. The equipment diagnostic computer 101 notifies the computer 104 of the evaluation work. The computer 104, in turn, requests the sputtering system 107 to carry out the evaluation work. The sputtering system 107 then executes operations accordingly. FIG. 11 shows a diagnostic item after the replacement of the target 501, equipment operation items and data items to be monitored. Note that, after replacement of the target 501, an exhaust operation is normally carried out. The sputtering system 107 first performs a vacuum exhaust operation in accordance with the equipment operation items shown in FIG. 11, exhausting the processing chamber 401 by means of the vacuum exhaust pump 310. The sputtering system 107 then carries out the baking of the processing chamber 401. The baking of the processing chamber 401 is done by operating the baking heater 602 in order to exhaust gas adhered to the processing chamber 401 during the vacuum exhaust operation. The baking heater 602 heats the processing chamber 401, exhausting the absorbed gas. After heating the processing chamber 401 for a predetermined period of time, the baking heater 602 is turned off. Finally, another vacuum exhaust operation is performed to continue the exhausting of the processing chamber 401. During the operations of the equipment described above, a total pressure, gas analysis data and, finally, again gas analysis data are monitored in accordance with the data items to be monitored shown in FIG. 11. The data monitored is sent to the equipment diagnostic computer 101 through the computers 103 and 104. In order to interpret the meanings of the data monitored during the operations of the equipment, the principle of operation of the sputtering system 107 must be known in detail. The operations of the equipment are closely related to variations in equipment state as in the case of an embodiment shown in FIG. 12. FIG. 12 can thus be used to interpret the meanings of the data monitored.

FIG. 12 shows a typical display of diagnostic data output by the equipment diagnostic computer 101. To be more specific, FIG. 12 shows the operation data, the mass analysis data and the total pressure of the equipment on a single page with a common measurement time axis. The data shown in FIG. 12 is extracted from the equipment operating state variation table 42 and the equipment operation career table 43 with a date and a diagnostic work item in the work career data table 41 used as an ID. Note that these tables are shown in FIG. 10. From the display shown in FIG. 12, the relation among the mass analysis data, the process state data and the operation data of the equipment becomes apparent. The display indicates that with the vacuum exhaust operation done by opening the main valve 302, the operation of the baking heater 602 increases the total pressure of the processing chamber 401 whereas turning off of the baking heater 602 decreases it. The variations in total pressure are regarded as normal and thus cannot be considered to be abnormal. It is necessary, however, to further analyze variations in state of the equipment based on the gas analysis data. The gas analysis data indicates that the main component of the gas discharged during the operation of the baking heater 602 is $H_2O$. The equipment state is judged by paying attention to variations of gas components after turning off the baking heater 602. In this case, the exhaust speed of $H_2O$ can be used as a criterion for determining whether or not a leak exists. As such, the variations of gas components shown in FIG. 12 are used to judge the state of the equipment. Normally, the criteria for judgement are stored as rules so as to allow an automatic judgement to be implemented. In this case, an exhaust speed of $H_2O$ of more than 1E-5 after baking indicates a normal condition. This criterion can be stored in advance or, as an alternative, a screen can be displayed using the equipment diagnostic computer 101 as shown in FIG. 12 and then stored as a rule. In this way, the embodiment allows data representing equipment state variations and equipment operations to be analyzed and a diagnostic rule for abnormality to be derived. In addition, the embodiment can also be used to implement a diagnostic technique allowing new rules to be added.

A technique for handling the equipment after the diagnostic can be added to diagnostic results based on diagnostic criteria adopted in the embodiment described above. In this way, a diagnosing technique and a diagnostic system can be provided to notify the user of actions to be taken for handling the equipment based on diagnostic results of the equipment.

In the diagnosing technique of the embodiment described above, while storing data representing operations and a condition of the equipment's operation in time sequence, the data is compared sequentially to diagnostic references. Then, comparison results are output one after another and a procedure for handling the equipment is indicated. In this way, a technique for diagnosing and controlling the equipment and its apparatus adopting the technique that are used to operate the equipment can thus be provided.

The embodiments described so far implement a sputtering system used in a semiconductor manufacturing equipment. It should be noted, however, that the invention is not restricted to a sputtering system. It can also be applied to others such as a CVD apparatus and an etching apparatus of the semiconductor manufacturing equipment as well.

In addition, for a plurality of equipments, a diagnostic system sharing the computer 101 can also be built. Furthermore, the invention can also be applied to apparatuses of equipments other than the semiconductor manufacturing equipment. Other applications include a thin-layer manufacturing equipment.

As described above, the invention allows rules for diagnosing an equipment to be instituted using information on operations and operating states of the equipments. The invention helps the user grasp phenomena that serve as a basis of the diagnosis.

In addition to the observation of the phenomena, the invention also supports the institution of diagnostic rules for diagnosing the equipment based on acquired data.

The invention further allows an equipment to be diagnosed using information on operations and operating states of the equipment.

Furthermore, since the state of the semiconductor manufacturing equipment can be diagnosed by automatically monitoring the operating state of the equipment all the time, equipment abnormalities and the like requiring maintenance work can be identified and a countermeasure can be devised at an early stage. Accordingly, the rate of operation of the equipment can be enhanced and, at the same time, products can be manufactured while sustaining the performance of the equipment and, thus, the quality of the products. As a result, the number of bad products caused by equipment deficiencies can be reduced.

We claim:

1. An equipment diagnostic support system comprising:
   - means for storing, with corresponding time sequence data, a career of recording data representing movements of manufacturing equipment's parts, and a career of recording process condition parameters used when processing a product produced by the manufacturing equipment;
   - means for displaying both of the careers; and
   - means for receiving an input to select data from said displayed careers and displaying selected data from both displayed careers with a common time axis.

2. A diagnostic system for a manufacturing equipment comprising:
   - means for acquiring, with corresponding time sequence data, information on a condition of the manufacturing equipment's processing operation and movements of the equipment's parts during the operation of the equipment;
   - means for storing predetermined diagnostic rules; and
   - means for determining whether or not an event prescribed by the diagnostic rules has occurred by checking the information under conditions prescribed by the diagnostic rules;
   - said means for storing predetermined diagnostic rules storing the diagnostic rules for each diagnostic item indicating an event to be diagnosed with the diagnostic rules including: rules for classifying data for specifying ranges of data related to an event, characteristic computation expressions for computing characteristics inherent in an event, and judgement rules comprising criterion references for judging the computed characteristics; and
   - said means for determining having a function of extracting data for each diagnostic item from the data acquired in time sequence in accordance with the rules for classifying data, computing characteristics of the extracted data using the characteristic computation expressions, checking the computed characteristics against the criterion references of the judgement rules, and obtaining corresponding judgement results.

3. A diagnostic system according to claim 2 having means for displaying messages describing actions to be taken from the judgement results.

4. A diagnostic system according to claim 2 capable of outputting control information for changing the operation of the equipment in accordance with the judgement results.

5. A diagnostic support system for a semiconductor manufacturing equipment according to claim 1 with said semiconductor manufacturing equipment being an apparatus for creating layers comprising a sequencer for controlling the operation thereof and a residual-gas analyzer for detecting gas components therein, wherein said means for acquiring information in time sequence is provided with a function for taking in:

information on a condition of said semiconductor manufacturing equipment's operation, comprising outputs of said residual-gas analyzer with time information added thereto, and information on operations of said semiconductor manufacturing equipment's parts, comprising information on movements of said equipment's parts as output by said sequencer with time information added thereto.

6. A diagnostic support system of a semiconductor manufacturing equipment comprising the steps of:

acquiring data, with corresponding time sequence information, representative of information on: a processing condition of said semiconductor manufacturing equipment's operation, and movements of said equipment's parts; and outputting the data, with corresponding time sequence information, representative of the movements and the information on a condition of the equipment's operation with time axes thereof representing a common time axis.

7. A diagnostic system for diagnosing a semiconductor manufacturing equipment comprising the steps of:

storing, with corresponding time sequence data, information on a condition of said semiconductor manufacturing equipment's operation during a start-up operation after being halted, and information on variations in position with time of said equipment's parts;

treating both kinds of the information as data having a common time axis, and computing time-related characteristics of variations in an operating condition of said equipment with respect to time-related movements of said parts;

comparing the characteristics to criterion references; and specifically describing a state of said equipment based on results of the comparison.

8. A diagnostic system for diagnosing a semiconductor manufacturing equipment comprising:

means for recording movements of parts of said equipment required for judging events to be diagnosed during an operation of said semiconductor manufacturing equipment;

means for programming the movements of said parts in said semiconductor manufacturing equipment;

means for executing the programmed movements of said parts in said semiconductor manufacturing equipment, and storing, with corresponding time sequence data, information on variations in position of said parts and information on a processing condition of said semiconductor manufacturing equipment's operation; and means for treating both kinds of information as data having a common time axis, computing characteristics of variations in condition of said equipment with movements of said parts, comparing the characteristics to criterion references, and specifically describing a state of said equipment based on results of the comparison.

* * * * *